3,706,821
NOVEL PHOSPHORUS AND HALOGEN-CONTAINING COMPOUNDS

James J. Anderson, Wendell M. Byrd, Jr., and Vasco G. Camacho, Richmond, Va., assignors to Mobil Oil Corporation
No Drawing. Continuation-in-part of application Ser. No. 826,019, May 19, 1969. This application Sept. 18, 1969, Ser. No. 859,196
Int. Cl. C07f 9/12; C09k 3/28; C08f 45/58
U.S. Cl. 260—951
7 Claims

ABSTRACT OF THE DISCLOSURE

The flammability of polymeric materials is substantially reduced or obviated by associating therewith novel halogen-containing phosphites, phosphates and phosphonates having characterizing groups

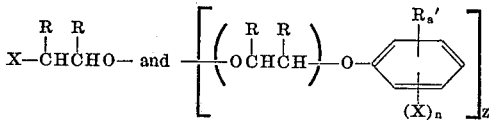

Polymeric materials can be processed at elevated temperatures of the order of 250–300° C. with certain of the phosphorus compounds.

RELATED APPLICATIONS

This application is a continuation-in-part of our application Ser. No. 826,019, filed May 19, 1969. The process for preparing halogenated compounds described in application Ser. No. 789,404, filed Jan. 6, 1969 can be used for the preparation of the halogen-containing phosphorus compounds of this invention.

BACKGROUND OF THE INVENTION

The present invention has to do with novel halogen-containing phosphites, phosphates and phosphonates, and with flame retarded polymeric compositions containing the same.

It is known that certain halogen-containing, organic phosphorus compounds are flame retardants for polymeric materials. Unfortunately, a variety of such compounds are not sufficiently stable to be used with certain polymeric materials which are processed at relatively high temperatures, for example 250–300° C. In addition, many polymer compositions containing known flame retardants are rendered non-flame retardant after exposure to environmental end-use conditions.

SUMMARY OF THE INVENTION

In accordance with the present invention, there are provided compounds represented by the general formula

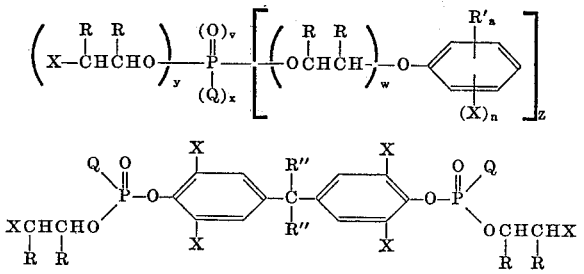

and mixtures thereof, wherein

X is bromine or chlorine or combinations of Br and Cl,
R is H, $CH_3$ or $CH_2X$, provided that when one R is other than H, the adjacent R is H, R' is X, alkyl, haloalkyl, alkoxy, aryl, haloaryl or arylalkyl, wherein halo is X,
R" is H or $CH_3$, Q is $OCHCHX$, $CHCHX$, alkyl, alkoxy,
     $\;\;\;\;|\;\;\;\;|\;\;\;\;\;\;\;\;|\;\;\;\;|$
     $\;\;\;\;R\;\;R\;\;\;\;\;\;\;\;R\;\;R$ haloaryloxyalkyl or haloarylpoly(oxyalkyl), wherein halo is X,
$a$ is 0, 1 or 2,
$n$ is 1, 2 or 3,
$v$ is zero or 1,
$w$ is 1, 2 or 3, or combinations of Br and Cl,
$x$ is zero or 1,
$y$ is 0, 1 or 2
$z$ is 1 or 2, and
the sum of $x+y+z$ is 3.

Compositions comprising an organic polymer and from about 2 to about 30 percent by weight, based upon the weight of the compositions, are also provided in accordance with the present invention.

As indicated, X is Cl, Br or Br-Cl mixtures to assure satisfying thermal stability for processing at high temperatures and/or good retention during detergent washing. Compounds of this invention wherein $w$ is 1, 2 or 3 are further advantageous as flame retardants in that no disagreeable phenolic odor is produced during burning of polymer compositions. Preferred compounds are those in which all halogen is bromine.

Within an individual haloalkoxyester group, when one R is $CH_3$ or $CH_2X$, the adjacent R is hydrogen.

Preferred ranges for number of carbon atoms for R' groups are as follows:

alkyl: $C_1$–$C_5$
haloalkyl: $C_1$–$C_5$ (with 1–3 halogen)
alkoxy: $C_1$–$C_5$
aryl: $C_6H_5$
haloaryl: halophenyl (with 1–5 halogen)
arylalkyl: $C_6H_5CH_2$ and $C_6H_5C_2H_4$, and particularly preferred R' groups are as follows:

alkyl: $CH_3$— and $CH_3CH_2$—
haloalkyl: $XCH_2$—, $X_2CH$—, $X_3C$— and $XCH_2CH_2$—
alkoxy: $CH_3O$— and $CH_3CH_2O$—
arylalkyl: $C_6H_5CH_2$.

It is also contemplated that mixtures of phosphites, mixtures of phosphates, mixtures of phosphonates, and mixtures of two or more thereof, are contemplated herein.

SPECIFIC EMBODIMENTS

The halogen-containing phosphorus compounds of this invention can be prepared by a variety of procedures. Preferred, however, is the procedure described in application Ser. No. 789,404 for the preparation of haloalkanol-halophenol mixtures, thereafter converted to the desired phosphorus compounds:

(1)
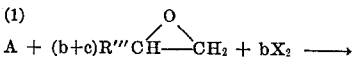

$AX_b + b(dR'''CHXCH_2OH + eR'''CHOHCH_2X) + cM$ wherein A is as defined below, X is bromine or chlorine, R''' is H, $CH_3$, $CH_2CH_3$, $C_6H_5$ or $CH_2X$; M represents the alkylene oxide adducts to the haloalcohol; b is a number corresponding to about 0.5 times the number of moles of A up to about a number equal to the number of reactive hydrogen atoms of A; c is the molar proportion of epoxide sufficing to remove small quantities of residual HX formed in the reaction when only b moles of alkylene oxide are used, and is generally from about 0.03 to about 0.1 times b; the sum of d and e is about 1, and generally e is greater than d when an unsymmetrical alkylene oxide is employed. Further, c may be considered to be the quantity of oxide required to replace the quantity which reacts with the alcohol during the overall reaction.

The aromatic organic compounds shown above by A and which serve as reactants are represented by the general formula $$(R^5)_m Ar(R^4)_p$$

wherein: Ar represents an aromatic nucleus; $R^4$ represents hydroxy, oxyalkanol, polyoxyalkanol and amino groups; and $R^5$ represents alkyl, haloalkyl, hydroxyalkyl, aryl, haloaryl and halogen.

Preferred homogeneous aromatic groups Ar are phenyl and substituted phenyl groups, such as

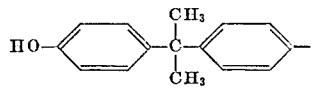

Typical alkylene oxides or epoxides which can be used in forming the desired phosphorus compounds include: ethylene oxide, propylene oxide, epichlorohydrin and epibromohydrin.

Typical halophenols, haloalkanols and halophenoxyalcohols for forming the desired phosphorus compounds include: bromophenols; 2,4-dibromophenol; bromoethanol; 1-bromo-2-propanol; chloroethanol; 1-chloro-2-propanol; 1,3-dibromo-2-propanol; 1,3-dichloro-2-propanol; 1-chloro-3-bromo-2-propanol; 2(bromophenoxy)ethanol; and 2-(2,4-dibromophenoxy)ethanol; 2(chlorophenoxy)ethanol; and 2-(2,4-dichlorophenoxy)ethanol.

Representative phosphorus halides for forming the desired phosphorus compounds, include: phosphorus trichloride and tribromide; and phosphorus oxychloride and oxybromide.

Mixtures produced from reaction (1) above have the following characteristics:

(a) $AX_b$ is seldom a single product. When A is phenol and $b$ is 2, the major product, $AX_b$, is 2,4-dihalophenol. Some mono- and trihalophenols are also produced.

(b) When R''' is $CH_3$ or $CH_2X$, a mixture of primary and secondary alcohols is produced usually in a ratio of about 30/70, respectively. Mixed primary and secondary phosphorus esters are produced from such a mixture in subsequent reactions.

(c) The concentration of M, alkylene oxide addition products of the haloalkanols, is usually relatively small but always present.

(d) A relatively small excess of alkylene oxide (up to 5–10% $b$ in excess of $b+c$) can be employed if desired.

Aryloxy analogs of the halophenol, haloalkanol mixtures described above can be prepared in several ways. One method involves the use of a phenoxyalkanol such as $C_6H_5O(C_2H_4O)_rH$ instead of phenol in the equation given above. ($r$ is an integer from 1 to 3.) A second method involves the reaction (2) indicated below:

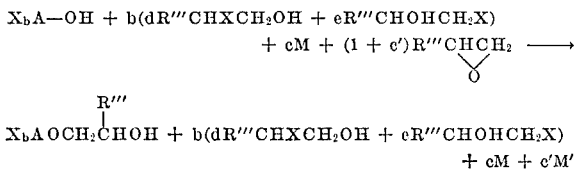

wherein M' represents additional alkylene oxide reaction products with the haloalkanols present and $c'$ represents the moles of alkylene oxide reacting to form M'.

Mixtures produced from reaction (2) have the following characteristics:

(a) The characteristics of products from reaction (1) are equally applicable.

(b) In most instances, only trace amounts of M' are produced.

(c) The preferred alkylene oxide for this reaction is ethylene oxide, although R''' can be $CH_3$ or $CH_2X$.

(d) The alkylene oxide generally is reacted with a phenol in a 1/1 molar ratio.

The mixture produced in reaction (1) or (2) can be modified by adding halophenols, halophenoxyalkanols, haloalkanols or alkanols thereto prior to formation of the desired phosphorus compounds. Such added compound or compounds can be the same or different from those present in the mixtures. Example IV provided below, illustrates this modification. Alternatively, a portion of the haloalcohol content of a mixture can be removed therefrom, as by distillation, to achieve a desired ratio of halophenol or halophenoxyalkanol to haloalkanol.

Another alternative is to form a desired mixture of halophenol-haloalkanol or halophenoxyalkanol-haloalkanol by blending the individual components. This alternative provides mixtures substantially free of other compounds but is less economical than the procedures represented by reaction (1) or (2).

Typical alkoxylated halogenated alcoholic mixtures include the following:

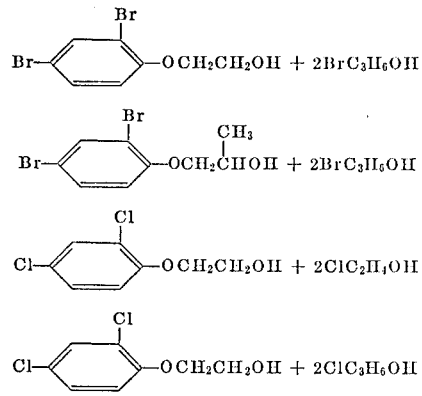

A mixed haloaryl, haloalkyl or haloaryloxyalkyl, haloalkyl phosphite can be produced by reaction of a phenol-alkanol or phenoxyalkanol mixture with $PX_3$ using an acid acceptor, such as ammonia as shown by reaction (3a):

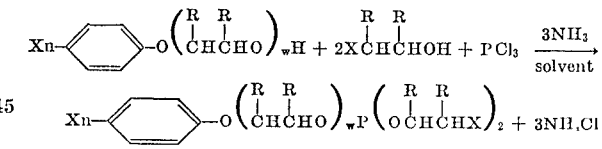

Phosphites produced by this method are more complex than by the process sequence described below, because (a) the halogen/haloalkanol and haloaryloxyalkanol/haloalkanol mixtures usually contain a variety of halophenols, halophenoxyalkanols and haloalkanols in relatively small concentrations when made according to reaction (1) or (2), in addition to the major components thereof, and (b) statistically, it is possible to form some tris(halophenyl), tris(halophenoxyalkyl) and/or tris(haloalkyl)phosphites.

The phosphites so obtained can be converted to the corresponding phosphates and phosphonates as described below. These derivatives will be at least as complex as the phosphite precursor.

Phosphites, phosphates and phosphonates of the character used in the compositions of this invention can be prepared in excellent purity by using the following reactions:

(3)

(4)

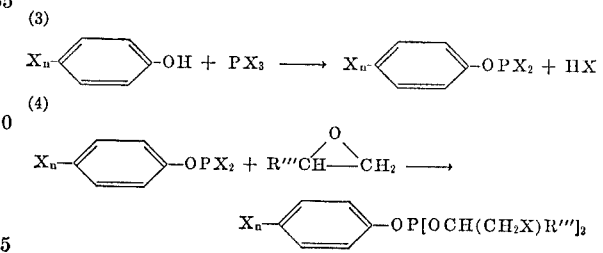

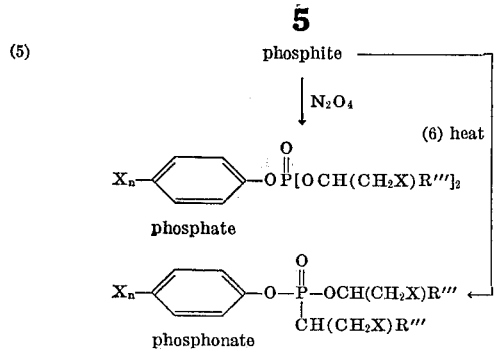

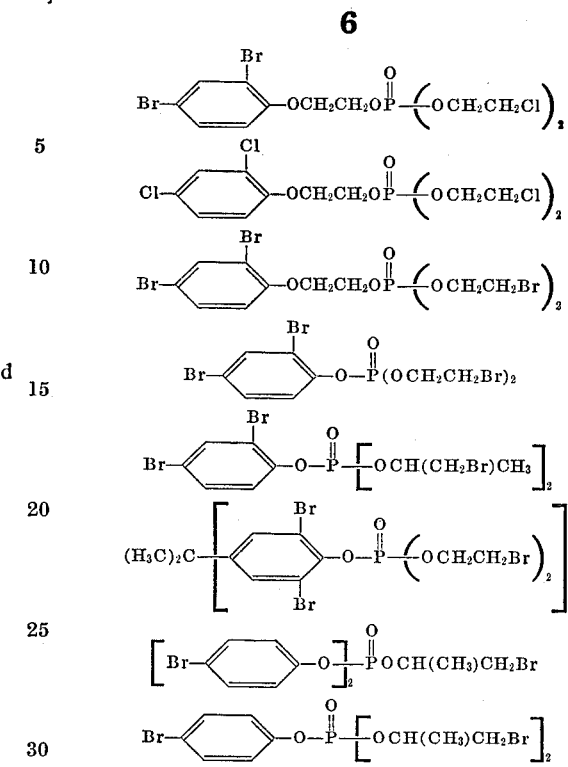

The following representative compounds can be formed by following the foregoing reaction sequences:

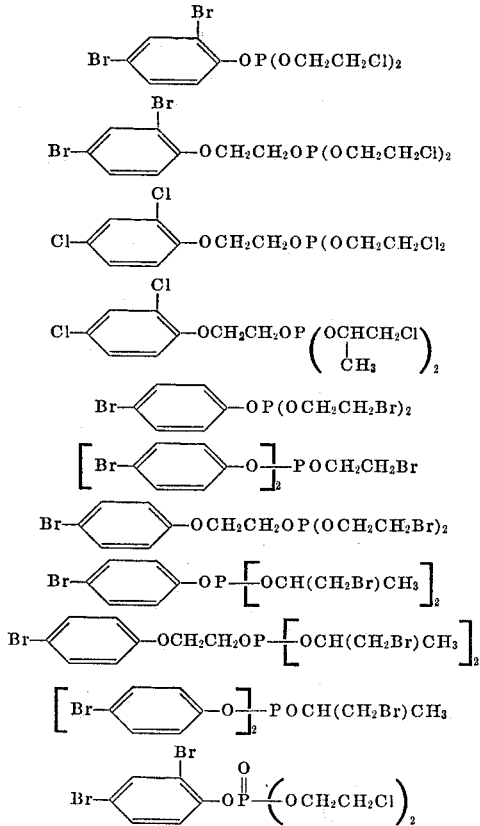

Phosphates can also be produced directly by the typical reactions set forth below:

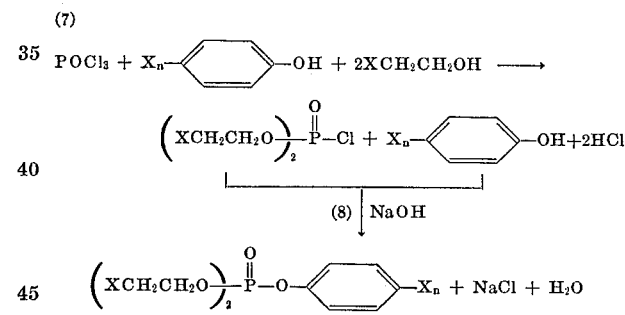

Compounds produced by the processes involving reaction (3a) or reactions (7) and (8), are considered to comprise "average" compositions with one or more major components. Typical examples are shown below in Table I:

TABLE I

| | Molar ratio of alcohol per mol of $PX_3$ or $POX_3$ | | Added alcohol | Average structure | Structure of major component(s) |
|---|---|---|---|---|---|
| | Halophenol | Haloalcohol | | | |
| (a)[1] | 1 | 1 | 1 | $(XArO)(X\overset{R}{\underset{|}{C}}H\overset{R}{\underset{|}{C}}HO)(RO)P$ | $(XArO)(X\overset{R}{\underset{|}{C}}H\overset{R}{\underset{|}{C}}HO)(RO)P$ |
| (b) | 1 | 2 | 0 | $XArOP(O\overset{R}{\underset{|}{C}}H\overset{R}{\underset{|}{C}}HX)_2$ | $XArOP(O\overset{R}{\underset{|}{C}}H\overset{R}{\underset{|}{C}}HX)_2$ |
| (c) | 1.5 | 1.5 | 0 | $(XArO)_{1.5}P(O\overset{R}{\underset{|}{C}}H\overset{R}{\underset{|}{C}}HX)_{1.5}$ | $(XArO)_2PO\overset{R}{\underset{|}{C}}H\overset{R}{\underset{|}{C}}HX$ plus $XArOP(O\overset{R}{\underset{|}{C}}H\overset{R}{\underset{|}{C}}HX)_2$ |
| (d)[1] | 2 | 1 | 0 | $(XArO)_2PO\overset{R}{\underset{|}{C}}H\overset{R}{\underset{|}{C}}HX$ | $(XArO)_2PO\overset{R}{\underset{|}{C}}H\overset{R}{\underset{|}{C}}HX$ |

[1] Combinations of halophenol and haloalcohol produced from reaction (1), above, are modified by adding or removing a halophenol or haloalcohol component to provide the desired molar ratio.

The following examples illustrate the invention. Typical reaction conditions are provided in the examples.

EXAMPLE I

Preparation of bis(2-chloroethyl)2,4-dibromophenyl phosphite

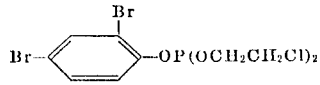

One third mole of 2,4-dibromophenol was melted and added to 1.5 moles of phosphorus trichloride. The mixture was heated to reflux and the HCl which formed was removed by nitrogen purge. After 3 hours, one third of the HCl had been removed as determined by titration with a base (aqueous NaOH). Magnesium chloride (0.003 mole) was added to the mixture, and refluxing continued for 3 hours at which time 98% of HCl was removed. Excess $PCl_3$ charged was removed by heating to 45° C. at 2 mm. pressure to yield 104.9 grams (99.1%) of 2,4-dibromophenyl phosphorodichloridite with a purity of 94.3% as indicated by a Volhard chlorine analysis.

Ethylene oxide (0.65 mole) was added slowly to 0.3 mole of the above phosphorodichloridite at a temperature below 20° C. The resulting mixture was allowed to stand at room temperature (about 20–25° C.) for 48 hours and was then stripped to remove excess oxide. A quantitative yield of bis(2-chloroethyl)2,4-dibromophenyl phosphite was obtained having a purity of 95.0% by reaction with iodine, a density of 1.757 and $n_D^{25.5}$ of 1.5738. Elemental analysis gave 7.22% P and 73.3% total halogen as Br compared to theoretical values of 7.03 and 72.4%, respectively. The product is identified hereinafter as Compound 1.

EXAMPLE II

Preparation of mixture of bis(2-bromoethyl)4-bromophenyl and bis(4-bromophenyl)2-bromoethyl phosphites

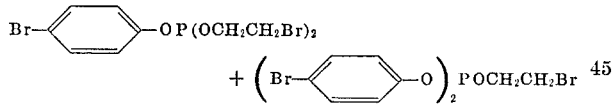

An approximate 50—50 molar mixture of 4-bromophenol and 2-bromoethanol was prepared by using phenol, bromine and ethylene oxide. To a stirred solution of 1 mole of phenol and 0.55 mole of ethylene oxide was added simultaneously 1.0 mole of bromine and 0.55 mole of ethylene oxide over a period of 30 minutes, while maintaining a reaction temperature between 0–5° C.

To 111.8 g. of the above bromophenol, bromoethanol mixture dissolved in 150 ml. ethylene chloride was added 34.2 g. of phosphorus trichloride over a period of forty-five minutes at −2 to 8° C. while maintaining a pH of 7–10 by simultaneous addition of anhydrous ammonia.

The resulting slurry was washed with 250 ml. of 2% ammonium hydroxide and the cloudy organic layer was separated and filtered. The organic layer was stripped to 80° C. and 10 mm. pressure. An 87.2% yield of the phosphite mixture was obtained. Iodine titration of the mixture showed 6.28% $P^{+3}$ compared to 6.52 theory. Elemental analysis gave 6.87% P and 48.2% Br compared to theoretical values of 6.52 and 48.6%, respectively, for a 50—50 mixture of the two phosphites. The product is identified hereinafter as Compound 2.

Mixed phenyl or 2,4-dibromophenyl esters stemming from phenol and 2,4-dibromophenol in the starting alcohol-phenol mixture may be eliminated by starting with a 50—50 molar synthetic mixture of pure 4-bromophenol and 2-bromoethanol.

EXAMPLE III

Preparation of mixture of bis(2-bromopropyl) 4-bromophenyl and bis(4-bromophenyl) 2-bromopropyl phosphite

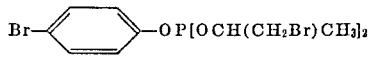

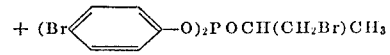

Compound 3 was prepared by the procedure outlined for Example II except that methylene chloride was used as solvent and triethyl amine was used as the acid acceptor. After washing with dilute ammonium hydroxide, the organic layer was stripped to 100° C. at 10 mm. pressure. An 85% yield of the phosphite mixture was obtained. Elemental analysis gave 5.78% P and 46.1% Br compared to theoretical values of 6.36 and 47.4%, respectively for a 50—50 molar mixture of the two phosphites.

EXAMPLE IV

Preparation of butyl 2-bromopropyl 2-bromophenyl phosphite

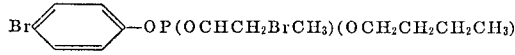

Compound 4 was prepared according to the process outlined for Example III except that 1.1 moles of n-butanol was added per mole of 4-bromophenol and bromopropanol prior to reaction with $PCl_3$, pentane was used as solvent, and $NH_3$ was used as the acid acceptor. The mixed phosphite which was formed was separated by washing the pentane-$NH_4Cl$-phosphite mixture with 2% ammonium hydroxide. The pentane layer was separated and dried over sodium sulfate, decanted and stripped to 80° C. and 30 mm. pressure. An 89.7% yield of the phosphite was obtained with a 7.27% $P^{+3}$ compared to 7.5% theoretical. Elemental analysis gave 8.0% P and 34.8% Br compared to theoretical values of 7.50 and 38.6%, respectively.

EXAMPLE V

Preparation of bis(2-chloroethyl) 2,4-dibromophenyl phosphate

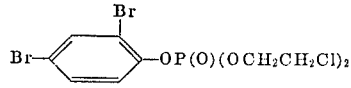

The phosphite of Example I was oxidized to Compound 5. Nitrogen tetroxide, 2.6 g. (20% molar excess), was added over a period of 5 minutes to 35.9 g. of the phosphite of Example I dissolved in 35.9 ml. of methylene chloride. The reaction temperature was maintained at 0 to −10° C. throughout the addition. The temperature was allowed to rise to ambient (20–25° C.). After standing for several days, the liquid product was stripped on a rotary evaporator to 80° C. at 5 mm. pressure. A 99.5% yield of the phosphate was obtained having $d_4^{20}$ 1.751, $n_D^{25}$ 1.5572 and an acid number of 18.1 mg. KOH/g. Elemental analysis gave 6.64% P and 69.2% halogen (as Br) compared to theoretical values of 6.78 and 69.8%, respectively. The product is referred to hereinafter as Compound 5.

EXAMPLE VI

Preparation of bis(2-bromoethyl) 2,4-dibromophenyl phosphate

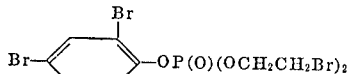

255.3 g. of a mixture containing approximately 0.5 mole 2,4-dibromophenol and 1.0 mole 2-bromoethanol (prepared according to the process outlined in Example II using 1 mole phenol, 2 moles bromine and 2.2 moles of ethylene oxide) was added over a period of 15 minutes to 0.5 moles of POCl₃ in a 1 liter flask equipped with a stirrer, thermometer, addition funnel, ice bath, water reflux condenser and Dry Ice trap. Reaction temperature was maintained at 5–10° C. throughout the addition. The reaction mixture was stirred at 10–15° C. for 30 minutes, then heated to 75°–80° C. and held at this temperature for 6.5 hours while blowing with nitrogen to remove hydrogen chloride. After cooling, 292.3 g. of product was obtained compared to 291.1 g. theoretical for bis(2-bromoethyl) phosphorochloridate plus unreacted 2,4-dibromophenol.

220 g. of the phosphorochloridate mixture was removed and transferred to an addition funnel. Methylene chloride, 400 ml., was added to the remaining product. 28 ml. (42.0 g.) of 50% sodium hydroxide was charged in a second addition funnel. The sodium hydroxide solution and phosphorochloridate were added simultaneously to the methylene chloride solution of phosphorochloridate over a period of fifteen minutes while maintaining a reaction temperature of 5–13° C. After addition was complete, another 3.9 g. of 50% sodium hydroxide was added to raise the pH to 8–9.

After aging for one hour below 10° C., 250 ml. of 4% sodium hydroxide and 300 ml. of water were added and the organic layer separated. The organic solution was washed again with 250 ml. of 2% sodium hydroxide followed by two 500 ml. water washes. The organic layer was stripped to 80° C. at about 25 mm. pressure. An 89.7% yield of bis(2-bromoethyl) 2,4-dibromophenyl phosphate was obtained having $n_D^{24}$ 1.5785, $d_4^{20}$>2.0 and an acid number of 0.08 mg. KOH/g. Elemental analysis gave 5.75% P and 60.1% Br compared to theoretical values of 5.67 and 58.6%, respectively. The compound is referred to hereinafter as Compound 6.

Alternate methods may be used to prepare this compound, one being the procedure of Example II using 2,4-dibromophenol, PBr₃ and ethylene oxide followed by oxidation with N₂O₄.

EXAMPLE VII

Preparation of bis(2-bromopropyl) 2,4-dibromophenyl phosphate

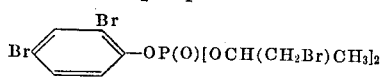

Compound 7 was prepared in a similar manner as shown in Example VI except that benzene was used as solvent. An 82.6% yield of the desired product was obtained having $d_4^{20}$ 1.896, $n_D^{24}$ 1.5755 and an acid number of 2.58 mg. KOH/gm.

EXAMPLE VIII

Preparation of tetrakis(2-bromoethyl) tetrabromo(Bisphenol-A)diphosphate

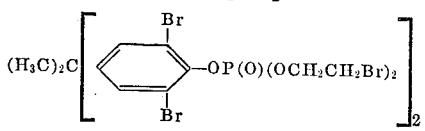

Compound 8 was prepared according to the procedure shown in Example VI using the reaction product of 1 mole Bisphenol-A, 4.24 moles ethylene oxide and 4 moles bromine. A 78.3% yield of the solid diphosphate was obtained having an acid number of 0.97 mg. KOH/g.

EXAMPLE IX

Preparation of mixture of bis(2-bromopropyl) 4-bromophenyl and bis(4-bromophenyl) 2-bromopropyl phosphates

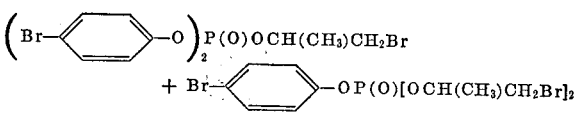

Compound 9 was prepared by oxidation of the phosphite mixture of Example III according to the procedure of Example V. A near quantitative yield of the corresponding phosphate mixture was obtained although about 20% of the phosphite remained as shown by iodine titration. The mixed phosphate also had $n_D^{21}$ 1.5601, $d_4^{20}$ 1.657 and an acid number of 57.5 mg. KOH/g.

EXAMPLE X

Preparation of 2-chloroethyl 2,4-dibromophenyl 2-chloroethylphosphonate

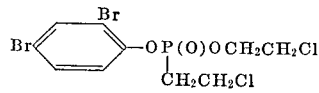

Compound 10 was prepared by isomerizing 36.7 g. of the phosphite of Example I by heating with 0.18 g. of I₂ and 0.37 g. of ethyl iodide at 125–150° C. and 160–165° C. for 7 and 32 hours, respectively. The product was stripped to 124° C. and 10 mm. pressure. An 80.4% yield of the phosphonate was obtained having $d_4^{20}$ 1.845, $n_D^{25}$ 1.5772 and an acid number of 12.5 mg. KOH/g. Elemental analysis gave 7.3% P and 68% total halogen (as bromine) compared to theoretical values of 7.03 and 72.4%, respectively.

EXAMPLE XI

Preparation of phosphonate mixture from bis(2-bromopropyl) 2-(4 - bromophenoxy)ethyl) and bis[2-(4-bromophenoxy)ethyl] 2-bromopropyl phosphite mixture

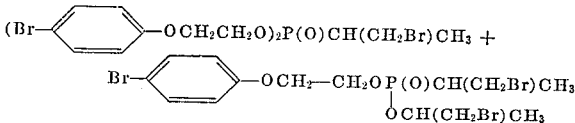

A phosphite mixture was prepared according to Example II using the reaction product of 1 mole phenol, 1 mole bromine and 1.2 moles propylene oxide and then ethylene oxide in Step II as in the following Example XII. A 82% yield of the mixed phosphites was obtained having $n_D^{25}$ 1.5603 and $d_4^{20}$ 1.605. Elemental analysis gave 5.60% P and 40.1% Br compared to theoretical values of 5.51 and 42.7%, respectively.

80 g. of the phosphite mixture was isomerized by heating with 0.4 g. I₂ at 120–137° C. for five and one-half hours. The mixed phosphonate product had a p⁺³ content of 0.03%, $n_D^{25}$ 1.5570 and elemental analysis gave 5.55% P and 39.0% Br.

EXAMPLE XII

Preparation of bis(2-chloroethyl)2-(2,4-dichlorophenoxy)ethyl phosphite

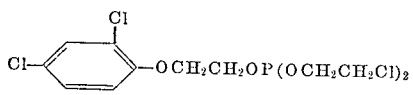

Step I—Preparation of chlorophenol, chloroethanol mixtures

To a stirred solution of 3 moles of phenol and 0.45 mole of ethylene oxide was added simultaneously 1.0 mole of chlorine and 0.43 mole of ethylene oxide over a period of 30 minutes, while maintaining a reaction temperature between 38–8° C. Since the reaction tended to freeze at temperatures below 15° C., an additional mole of ethylene oxide was added, the mixture cooled to 0°, and 4.4 additional moles of ethylene oxide and 5 additional moles of chlorine were added simultaneously over a period of three hours, while maintaining a reaction temperature of −3 to 5° C.

Gas chromatographic analysis of the reaction product revealed (a) 2,4-dichlorophenol and 2-chloroethanol as the major components, (b) 2-chlorophenol, 4-chlorophenol and 2,4,6-trichlorophenol as minor components and (c) ethylene oxide and several ethylene oxide adducts of chloroethanol as trace components.

Step II—Conversion of chlorophenols in above mixture to 2(chlorophenoxy)ethanols To 947 g. of the above mixture containing about 2.88 moles of halogenated phenols in a 2 liter pressure apparatus was added 4.05 moles of ethylene oxide and 1.1 g. of sodium formate. The mixture was heated with stirring to 103° C. over a period of 1 hour and 50 minutes at which point a maximum gauge pressure of 48 p.s.i. was observed. Heating was continued for about 4 hours to 120° C. during which time the pressure continued to drop until 37 p.s.i. gauge pressure was observed at the end of this heating period. An additional 1 hour and 45 minutes heating period at 120° C. failed to further reduce gauge pressure. A golden yellow liquid product was obtained in near quantitative yield.

Gas chromatographic analysis of the unstripped product revealed only traces of the original phenols and an excess of ethylene oxide approximately equal to 0.5 moles excess ethylene oxide per mole of original phenol. The major components were chloroethanol and 2(2,4-dichlorophenoxy)ethanol. Minor quantities of the ethylene oxide addition products of 2,4,6-trichlorophenol, 2-chlorophenol, 4-chlorophenol and ethanol were also found.

Step III—Formation of phosphite from above mixture

To a 1 liter, 7-neck round-bottom flask equipped with stirrer, thermometer, pH meter probe, 2 addition funnels, nitrogen purge tube, ammonia bubbling pipe and Dry Ice bath was added 10 g. of the mixed alcohol product from Step II and 256 g. of ethylene chloride. Phosphorus trichloride (0.25 mole) was added to one of the addition funnels and diluted to 60 ml. with ethylene chloride. To the other addition funnel was added 85.7 g. of the mixed alcohol product from Step II and diluted to 120 ml. with solvent.

After cooling the contents of the flask to 2° C., ammonia was bubbled in until a pH of 9.0 was observed. The $PCl_3$ and alcohol mixture was added simultaneously over a period of about 20 minutes while maintaining (a) a balanced flow (molar quantities) of $PCl_3$ and alcohol mixture (b) a pH of 8.5–9.0 and a reaction temperature of 0–3° C. 400 ml. of 3% ammonium hydroxide was added to the slurry and after agitation to dissolve the ammonium chloride, the organic layer was separated and stripped to 25° C. at 10 mm. pressure. A 94.6% yield of the phosphite was obtained having an acid number of 1.6 $d_4^{20}$ 1.396 and $n_D^{24.3}$ 1.5371. Iodine titration showed a purity of 80.0%. This compound is identified as Compound 12.

EXAMPLE XIII

Preparation of bis(2-chloropropyl)2-(2,4-dichlorophenoxy)ethyl phosphite

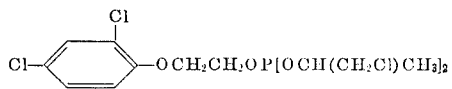

68.3 g. (0.33 mole) of 2,4-dichlorophenoxyethanol was added to 226.6 g. (1.65 moles) of phosphorus trichloride at 5° C. over a period of about ten minutes. Stirring and cooling was applied during this period to maintain a reaction temperature of 5–7° C. After removal of the ice-bath, the temperature rose to 25° C. over a period of one and one-half hours. Heat was applied over the next two and one-half hours to maintain a reaction temperature of 75–81° C. The evolving HCl was absorbed in water and 104% of theory was evolved.

After standing overnight, the excess $PCl_3$ was stripped up to 45° C. and 2 mm. pressure. 99.6 g. of the light yellow 2,4-dichlorophenoxyethyl phosphorodichlorodite was obtained corresponding to a 98% yield based on 2,4-dichlorophenoxyethanol. Gas chromatographic analysis of the phosphorodichlorodite showed only traces of $PCl_3$ and the phenoxyethanol. Purity by the Volhard method was 94.3%.

Propylene oxide, 0.97 mole, was added to 0.32 mole of the above dichlorodite in a 250 ml. flask equipped with a stirrer, thermometer, addition funnel, Dry Ice condenser and ice bath over a period of 30 minutes while maintaining a reaction temperature of 14–20° C. A reaction temperature of 16–25° C. was maintained over a period of two hours.

After standing overnight, the product was stripped to 80° C. at 10 mm. 134.4 g. of the light yellow, bis(2-chloropropyl)2,4-dichlorophenoxyethyl phosphite was obtained corresponding to a yield of 98% based on phosphorodichlorodite. Gas chromatographic analysis showed the presence of only a trace of tris(2-chloropropyl)phosphite. Elemental analysis gave 7.33% P and 34.4% Cl compared to 7.30% P and 33.4% Cl, respectively. Iodine titration showed a purity of 96.5%. A density, $d_4^{20}$, of 1.258 and an index of refraction at 25° C. of 1.5299 were found. This compound is identified as Compound 13.

EXAMPLE XIV

Preparation of bis(2-chloropropyl)2-(2,4-dichlorophenoxy)ethyl phosphate

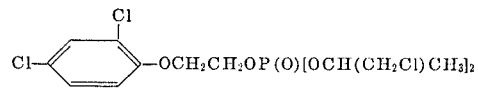

Nitrogen tetroxide, 2.9 g. (20% molar excess), was added over a period of 10 minutes to 39.3 g. of the phosphite of Example XIII dissolved in 39 ml. of methylene chloride. The reaction temperature was maintained at 0 to −10° C. throughout the addition. The temperature was allowed to rise to ambient. After standing for several days, the liquid product was stripped on a rotary evaporator to 80° C. at 5 mm. pressure. A 97% yield of the phosphate was obtained having $d_4^{20}$ 1.336, $n^{25}$ 1.5189 and an acid number of 18.0 mg. KOH/gm. Iodine titration gave 0.6% $P^{+3}$. Elemental analysis gave 6.97% P and 29.8% Cl compared to theoretical values of 7.04 and 32.2%, respectively. This compound is identified as Compound 14.

EXAMPLE XV

Preparation of tetrakis(2-chloroethyl) tetrachloro (Bisphenol-A) diphosphite

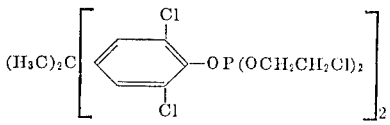

Compound 15 was prepared according to the procedure of Example XII. After washing the slurry with 3% ammonium hydroxide followed by a second wash with 3% sodium hydroxide, the resulting organic layer was stripped to 90° C. at 10 mm. pressure. A 78% yield of the white, waxy solid was obtained. A $P^{+3}$ and $P^{+5}$ analysis gave 7.12 and 0.93%, respectively, compared to a theoretical total phosphorus value of 8.31.

EXAMPLE XVI

Preparation of bis(2-chloropropyl)2-(2,4-dichlorophenoxy)ethyl phosphonate

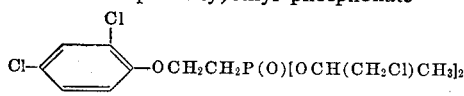

Compound 16 was prepared by heating 40.3 g. of the phosphite of Example XIII with 0.2 g. $I_2$ at 120–125° C. for 2 hours and 150–155° C. for 13 hours. After stripping to 124° C. at 10 mm. pressure, a 89.8% yield of the corresponding phosphonate was obtained having $d_4^{20}$ 1.404, $n_D^{25}$ 1.5291, and an acid number of 2.8 mg. KOH/g. Elemental analysis gave 7.69% P and 32.61% Cl compared to theoretical values of 7.30 and 33.4%, respectively.

POLYMERIC MATERIALS

The polymeric materials employed in the compositions of this invention can be natural, regenerated or synthetic. Included among natural materials are: cotton, cellulose, paper and silk. Regenerated polymers include: viscose rayon and "cuprammonium rayon." Typical synthetic materials include: cellulose esters and ethers, such as acetate rayon, cellulose acetate butyrate and ethyl cellulose; polyvinyl chloride; polyurethanes; polycarboxamides of the nylon type; polyacrylonitrile; polyethylene; polypropylene; polystyrene; alkyd resins; urea resins; polyisobutylenes; polymethyl methacrylates; phenol aldehyde resins; linear and cross-linked polyesters; maleic anhydride heteropolymers; styrene-methacrylate copolymers.

While improvement in flame resistance and excellent retention is afforded by incorporating the phosphorus compounds of this invention in a wide variety of polymers, the preferred polymers are cellulosics (such as viscose rayon, acetate rayon, cellulose acetate butyrate), polystyrene, polyurethanes, polyvinyl chloride, polyethylene terephthalate polyesters, polyolefins and polyacrylonitrile.

One or more of the compounds of this invention provide excellent flame properties in combination with most natural, regenerated and synthetic polymer systems.

It is to be noted that while all compounds of this invention are substantially superior to known flame retardants such as tris (haloalkyl) phosphates and bis (haloalkyl) halo-alkyl phosphonates regarding resistance to detergent washing of acetate rayon compositions as shown below in Table II, the same does not apply for all polymer compositions. For example, Compound 6 was found superior in polyacrylonitrile, as other compounds of this invention (as well as the tris (haloalkyl) phosphorus derivatives) are lost during detergent washing. Conversely, almost all polystyrene, polyvinyl chloride and cellulose acetate butyrate films containing either compounds of this invention or known flame retardants retained their flame resistance after detergent washing by our standard procedure. It is believed, however, that the retentive properties of compounds of this invention would be superior to conventional flame retardants such as the tris(haloalkyl) phosphates in most polymer systems provided the exposure time is decreased in the case of polyacrylonitrile or increased in the case of the more hydrophobic polymers such as polystyrene, polyolefin, PVC, etc. Most of the compounds of this invention possess unusually high stability for high temperature processing, and are stable to detergent washing in most polymer systems.

The physical form of the polymer-phosphorus-compound composition can vary widely. While textile fibers are of major interest, films, coatings, sheets, rods, boards, and the like can be used. Excellent retention of flame resistance is achieved when the flame retardant is distributed rather uniformly throughout the polymer; however, surface treatments are also advantageous.

One or more of the phosphorus compounds described herein can be incorporated in the polymer during the polymerization step or by admixing with the polymer prior to or during milling, extrusion, spinning, foaming or other conventional operations used for forming or applying the polymeric end product.

POLYMERIC COMPOSITIONS

Representative halogen-containing phosphorus compounds have been incorporated in one or more polymer systems at one or more concentrations.

EXAMPLE XVII

Results of flame tests made with a number of compositions comprising an acetate rayon (cellulose acetate) and a halogenated phosphorus compound are provided below in Table II. The rayon employed was in the form of commercial raw flakes used for fiber spinning. A control composition is also shown.

A phosphorus-halogen compound was added to 10% acetone solution of acetate rayon in a quantity equal to 4, 8, and 16% of the total weight of acetate rayon plus phosphorus-halogen compound. Films were cast from the solutions, air dried for about one hour and conditioned at 73° F., 50% relative humidity for at least 24 hours before testing. Dry film thickness was 1.0–1.5 mils.

The flame properties of each film composition were evaluated according to the procedure described below.

Three or more ½" x 2" samples were cut from each film composition. Each sample was folded with creasing along the 2" axis to form a V shape (end view) whereby each side of the V was approximately ¼" and the angle formed by the sides of the V was approximately 90°. One end of the sample was placed in a single clamp in such a manner that the free end could be ignited with a paper match.

Samples of each composition were tested in one or more of the positions as defined below:

| Path of flame propagation after ignition of free end: | Position |
|---|---|
| Downward and 90° to horizontal | 0° |
| Downward at 45° to horizontal | 45° |
| Horizontal | 90° |
| Upward at 45° to horizontal | 135° |
| Upward at 90° to horizontal | 180° |

The flame was applied for 2 seconds at the bottom point of the V of the free end and removed. If the flame progressed to the clamp, the sample was considered non-self-extinguishing (NSE) in that position. If the sample was self-extinguishing (SE) before the flame reached the clamp, the flame was applied for another two seconds. If the sample was SE before reaching the clamp after the second ignition it was considered SE in that position.

Generally, the first sample of each film composition was tested in the 90° position. If it was found to be NSE at 90°, additional samples were tested sequentially in the 45° and 0° position. If the second sample was SE at 45°, this was considered the maximum angle whereby the sample would be found SE and recorded as such. If however, the first sample tested in the 90° position was found to be SE, additional samples were tested sequentially in the 180° and 135° positions. For clarification of flame properties ratings in Table II and subsequent tables, the table below rates flame properties as assessed in individual positions and overall rating.

| Positions tested (performance) | Overall rating |
|---|---|
| 90° (NSE), 45° (SE) | 47 |
| 90° (NSE), 45° (NSE), 0° (SE) | 0 |
| 90° (NSE), 45° (NSE), 0° (NSE) | NSE |
| 90° (SE), 180° (SE), 135° (SE) | 180 |
| 90° (SE), 180° (SE), 135° (NSE) | 180/90 |
| 90° (SE), 180° (NSE), 135° (SE) | 135 |

It is to be understood that flame resistance varied proportionately to the numerical value assigned for the overall rating (corresponding to the position as defined above). Thus, flame resistance is greatest with a value of 180°, and least with a value of NSE. The data in Table II shows the excellent improvement in flame resistance provided by the halogen containing phosphites and phosphonates compared to the control.

After a 4 hour wash period, the film strips were thoroughly rinsed in water and allowed to dry overnight at room temperature.

The flame properties on acetate rayon film compositions before and after washing are shown in Table II-A, wherein Compound 6 —$Br_2\phi OP(O)(OC_2H_4Br)_2$— of this invention is compared with $(ClCH_2CH_2O)_3PO$, which is included for comparative purposes.

TABLE II.—ACETATE RAYON, FLAME RETARDANT COMPOSITIONS

| Compound Number | Structure | Flame properties at— | | | | | |
|---|---|---|---|---|---|---|---|
| | | 16% loading | | 8% loading | | 4% loading | |
| | | Before a | After b | Before a | After b | Before a | After b |
| | Phosphates | | | | | | |
| 7 | $Br_2\phi P(O)[OCH(CH_2Br)CH_3]_2$ | 180 | 90 | 180 | 45 | 180 | NSE |
| 6 | $Br_2\phi P(O)(OC_2H_4Br)_2$ | 180 | 180 | 180 | 180 | 180 | 135 |
| | $(BrCH_2CH_2O)_3P(O)$ | 180 | NSE | 180 | NSE | 180 | NSE |
| 8 | $(CH_3)_2C\left[\underset{Br}{\overset{Br}{\bigcirc}}OP(O)(OC_2H_4Br)_2\right]_2$ | 45 | 45 | 0 | 0 | 0 | 0 |
| 5 | $Br_2\phi OP(O)(OC_2H_4Cl)_2$ | 180 | 45 | 180 | 0 | 180 | NSE |
| 14 | $Cl\underset{Cl}{\overset{Cl}{\bigcirc}}OCH_2CH_2OP(O)(OC_3H_6Cl)_2$ | 180 | 35 | 180 | 0 | 180 | 0 |
| | $(ClC_2H_4O)_3P(O)$ | 180 | 0 | 180 | NSE | 135 | NSE |
| | Phosphonates | | | | | | |
| 10 | $Br_2\phi OP(O)OC_2H_4Cl$ <br> $\;\;\;\;\;\;\;\;\;\;\;\;\;\;\;CH_2CH_2Cl$ | 180 | 45 | 180 | 45 | 180 | 0 |
| 16 | $Cl_2\phi OCH_2CH_2PO(OC_3H_6Cl)_2$ | 180 | 0 | 90 | 0 | 180 | 0 |
| | $BrCH_2CH_2PO(OCH_2CH_2Br)_2$ | 180 | NSE | 180 | NSE | 180 | NSE |
| | Phosphites | | | | | | |
| 1 | $Br_2\phi P(OC_2H_4Cl)_2$ | 45 | 0 | 45 | NSE | 45 | NSE |
| 13 | $Cl_2\phi OC_2H_4OP(OC_3H_6Cl)_2$ | 45 | NSE | 0 | NSE | 0 | NSE | a Before detergent washing; b After detergent washing.
NOTE.—Control (no flame retardant added) =NSE The flame properties of film compositions were also determined after washing 2″ x 8″ film strips in water containing a typical laundry detergent at 80° C. for four hours. Ten film strips were washed at one time by combining the strips in a bundle composed of alternating layers of a 2″ x 6″ screen wire (¼″ mesh) strips, 1″ x 2″ cardboard strips at one end (serving as ⅛″ spacer), and the film strip. The bundle was immersed into a heated water bath (80° C.) to a depth of about 6″ and 4″ with respect to the film strips and screen wire strips, respectively. The bundle was supported by two large 3-pronged clamps by closing the clamps across the top end of the bundle with the cardboard spacers. Clamp pressure was applied across the cardboard spacers in such a manner that the bottom of the bundle was spread to allow about ¼″ distance between each screen wire strip.

About 2 liters of water was used for each bundle. The water was stirred by means of a magnetic stirrer and contained 12.5 g. of detergent with the compositions as follows:

| | Pts. |
|---|---|
| Alkylphenoxypoly(ethyleneoxy)ethanol | 10.0 |
| Sodium dodecylbenzene sulfonate | 5.0 |
| Sodium tripolyphosphate | 35.0 |
| Borax | 10.0 |
| Sodium metasilicate | 5.0 |
| Sodium carbonate | 33.5 |

TABLE IIA.—ACETATE RAYON FLAME RETARDANT COMPOSITIONS

| | Percent flame retardant in composition— | | |
|---|---|---|---|
| Compound | Theoretical loading | Found a | |
| | | Before | After |
| 6, Table II | 16 | 16 | 12.5 |
| | 8 | 9.2 | 10.4 |
| | 4 | 4.3 | 4.3 |
| $(ClCH_2CH_2O)_3PO$ | 16 | 14.5 | 3.6 |
| | 8 | 6.3 | 3.9 |
| | 4 | 5.2 | 1.4 | a Percent flame retardant agent found, based upon average values calculated from percent P and percent X found.

EXAMPLE XVIII

Films were cast from a 10% solution of polyacrylonitrile in dimethyl formamide containing 8, 16% and 24% (based on weight of polymer plus flame retardant) of the phosphorus-halogen compounds as shown in Table III. The polyacrylonitrile used was in the form of knitting yarn identified as 100% Orlon. The films were dried for 20 minutes in a forced draft oven at 105–110° C., stripped, heated for an additional hour at 105° C. and allowed to condition for 24 hours at 73° F., 50% relative humidity before testing. Film thickness was approximately 1 mil, and all films including the control were hazy.

The flame properties of each film were determined as described before in connection with the rayon compositions. The results are summarized in Table III.

phorus based on the total weight of cellulose and phosphorus compound. After formation of the viscose rayon

TABLE III.—POLYACRYLONITRILE, FLAME RETARDANT COMPOSITIONS

| Compound Number | Structure | Flame properties at— | | |
|---|---|---|---|---|
| | | 24% loading | 16% loading | 8% loading |
| *Phosphates* | | | | |
| 7 | $Br_2\phi OP(O)(OC_3H_6Br)_2$ | 45 | 45 | NSE |
| 6 | $Br_2\phi OP(O)(OC_2H_4Br)_2$ | 45 | 45 | 0 |
| 5 | $Br_2\phi OP(O)(OC_2H_4Cl)_2$ | 45 | 0 | NSE |
| 14 | $Cl_2\phi OCH_2CH_2OP(O)(OC_3H_6Cl)$ | 45 | 0 | NSE |
| 8 | $(CH_3)_2C-[\text{(Br,Br-phenyl)}-OP(O)(OC_2H_4Br)_2]_2$ | ---- | 0 | NSE |
| *Phosphonates* | | | | |
| 10 | $Br\phi OP(O)(OCH_2CH_2Cl)$ <br> $\hspace{1em}\vert$ <br> $\hspace{1em}CH_2CH_2Cl$ | 45 | 0 | NSE |
| 16 | $Cl_2\phi OCH_2CH_2P(O)(OC_3H_6Cl)_2$ | 0 | 0 | NSE |
| *Phosphites* | | | | |
| 1 | $Br_2\phi OP(OC_2H_4Cl)_2$ | 90 | 45 | 45 |
| 13 | $Cl_2\phi OCH_2CH_2OP(OC_3H_6Cl)_2$ | 45 | 45 | NSE |

Note.—Control (no flame retardant added) = NSE.

EXAMPLE XVIX

Films were cast from a 10% acetone solution of cellulose acetate butyrate containing 2, 4, 8, and 16% based on total solids weight of the compounds as shown in Table IV. The wet films were dried, stripped and conditioned for 24 hours at 73° F., 50% relative humidity. All films, including a control, were clear.

The flame properties of each composition were determined according to the procedures given above in connection with the rayon compositions, and the results are shown in Table IV.

film by regeneration in a sulfuric acid bath, the film was washed and dried at elevated temperatures. The films were conditioned at 73° F., 50% relative humidity for at least 24 hours prior to testing.

The flame resistance of each rayon-flame retardant film composition was determined as described above in regard to the rayon compositions above. The film compositions were analyzed for phosphorus and halogen to assess the retention of zame retardant after film preparation. These results are shown in Table V.

It is to be noted that the "capture" and retention of the

TABLE IV.—CELLULOSE ACETATE BUTYRATE, FLAME RETARDANT COMPOSITIONS

| Compound Number | Structure | Flame properties at— | | | |
|---|---|---|---|---|---|
| | | 16% loading | 8% loading | 4% loading | 4% loading |
| *Phosphates* | | | | | |
| 7 | $Br_2\phi OP(O)(OC_3H_6Br)_2$ | 180 | 180 | 180 | ---- |
| 6 | $Br_2\phi OP(O)(OC_2H_4Br)_2$ | 180 | 135 | 90 | ---- |
| 5 | $Br_2\phi OP(O)(OC_2H_4Cl)_2$ | 180 | 180 | 180 | ---- |
| 14 | $Cl_2\phi OCH_2CH_2OP(O)(OC_3H_6Cl)_2$ | ---- | 135 | 90 | 45 |
| *Phosphonates* | | | | | |
| 10 | $Br_2\phi OP(O)OC_2H_4Cl$ <br> $\hspace{1em}\vert$ <br> $\hspace{1em}CH_2CH_2Cl$ | 180 | 180 | 90 | ---- |
| 16 | $Cl_2\phi OCH_2CH_2P(O)(OC_3H_6Cl)_2$ | ---- | 135 | 135 | 45 |
| *Phosphites* | | | | | |
| 1 | $Br_2\phi OP(OC_2H_4Cl)_2$ | ---- | 45 | 45 | 45 |
| 13 | $Cl_2\phi OCH_2CH_2OP(OC_3H_6Cl)_2$ | ---- | NSE | NSE | 45 |

Note.—Control (no flame retardant added) = NSE.

EXAMPLE XX

Viscose rayon films were cast from cellulose xanthate solutions containing one or more levels of the compounds shown in Table V. These compounds were dispersed in a xanthate solution at levels of 1.0% and/or 1.5% phoscompounds of this invention is substantially greater than for conventional flame retardants during the preparation of the viscose rayon films. This is illustrated by the loading percentages of Compound 11, for example, in comparison with the loading percentages for comparative compounds $(BrC_2H_4O)_3P$, $(BrC_3H_6O)_3P$ and $(ClC_2H_4O)_3P$.

TABLE V.—VISCOSE RAYON FLAME RETARDANT COMPOSITIONS

| Compound Number | Structure | Percent loading | | Flame rating |
|---|---|---|---|---|
| | | Theory | Found | |
| | Phosphonates | | | |
| 11 | $(Br\phi OCH_2CH_2O)_2 P(O)C_3H_6Br$ | 18.1 | 13.0 | 90 |
| | Plus | | | |
| | $Br\phi OCH_2CH_2OP(O)OC_3H_6Br$ <br> $\quad\quad\quad\quad\quad\quad\quad\quad \vert$ <br> $\quad\quad\quad\quad\quad\quad\quad\quad C_3H_6Br$ | 27.2 | 21.2 | 90 |
| | $(BrC_3H_6O)_2P(O)C_3H_6Br$ | 21.5 | 8.6 | 45 |
| | Phosphites | | | |
| 3 | $Br\phi OP(OC_3H_6Br)_2$ | 15.7 | 14.4 | 70 |
| | Plus | | | |
| | $(Br\phi O)_2POC_3H_6Br$ | 23.4 | 18.3 | 90 |
| 4 | $Br\phi OP[OCH(CH_2Br)CH_3](OBu)$ | 13.4 | 11.7 | 45 |
| | | 20.0 | 13.8 | 45 |
| | $(BrC_2H_4O)_3P$ | 19.5 | 4.1 | NSE |
| | $(BrC_3H_6O)_3P$ | 21.6 | 1.7 | NSE |
| | $(ClC_2H_4O)_3P$ | 13.0 | 0.7 | NSE |

Note.—Control (no flame retardant added) = NSE.

EXAMPLE XXI

Films were prepared from a 10% solution of polystyrene in benzene containing 4, 8, 16 and 24% of the compounds as shown in Table VI based on the total solids weight of polystyrene and phosphorus-halogen compound. The polystyrene sample was obtained by dissolving polystyrene foam in benzene. After drying the wet films at 50° C. for 45 minutes, the dry films were stripped and conditioned at 73° F., 50% relative humidity for 24 hours. The flame properties of the films were determind according to the test procedures given for acetate rayon films given above. The results are shown in Table VI.

dioctyl phthalate (DOP) and 2, 4, 8 and 16% of the compounds as shown in Table VII. The concentration of the flame retardant was based on the total weight of solids (PVC, DOP and flame retardant). The films were dried at 50° C. for 30 minutes and dry film thickness was about 1 mil. While the control was quite flexible, the compositions containing the flame retardants were even more highly plasticized.

The flame properties were determined on each composition as described above except that the sample used for flame test was prepared by cutting a 1" x 2" strip and folding twice to make a ¼" x 2" test strip. This

TABLE VI.—POLYSTYRENE, FLAME RETARDANT COMPOSITIONS

| Compound Number | Structure | Flame properties at— | | | |
|---|---|---|---|---|---|
| | | 24% loading | 16% loading | 8% loading | 4% loading |
| | Phosphates | | | | |
| 7 | $Br_3\phi OP(O)(OC_3H_6Br)_2$ | | 45 | 45 | 45 |
| 6 | $Br_3\phi OP(O)(OC_2H_4Br)_2$ | 135 | 180 | 180 | |
| 5 | $Br_3\phi OP(O)(OC_2H_4Cl)_2$ | | 180 | 45 | 45 |
| 14 | $Cl_2\phi OC_2H_4OP(O)(OC_3H_6Cl)_2$ | 45 | 45 | 45 | |
| | Phosphonates | | | | |
| 10 | $Br_3\phi OP(O)OC_2H_4Cl$ <br> $\quad\quad\quad \vert$ <br> $\quad\quad\quad CH_2CH_2Cl$ | | 45 | 45 | 0 |
| 16 | $Cl_2\phi OC_2H_4P(O)(OC_3H_6Cl)_2$ | 45 | 45 | 0 | |
| | Phosphites | | | | |
| 1 | $Br_3\phi OP(OC_2H_4Cl)_2$ | 45 | 45 | 45 | |
| 13 | $Cl_2\phi OCH_2CH_2OP(OC_3H_6Cl)_2$ | 45 | 45 | 45 | |

Note.—Control (no flame retardant added) = NSE.

EXAMPLE XXII

Films were prepared from a methyl ethyl ketone solution of 8.8% polyvinylchloride (PVC; GEON 121), 2.7% modification was necessary to provide adequate rigidity of the film sample to be self-supporting at the required test angles. The results are tabulated in Table VII.

TABLE VII.—POLYVINYL CHLORIDE, FLAME RETARDANT COMPOSITIONS

| Compound Number | Structure | Flame properties at— | | | |
|---|---|---|---|---|---|
| | | 16% loading | 8% loading | 4% loading | 2% loading |
| Phosphates | | | | | |
| 7 | $Br_2\phi OP(O)(OC_3H_6Br)_2$ | 180 | 180 | 135 | |
| 6 | $Br_2\phi OP(O)(OC_2H_4Br)_2$ | 180 | 180 | 180 | |
| 5 | $Br_2\phi OP(O)(OC_2H_4Cl)_2$ | 180 | 180 | 135 | |
| 14 | $Cl_2\phi OC_2H_4OP(O)(OC_3H_6Cl)_2$ | | 180 | 90 | 90 |
| Phosphonates | | | | | |
| 10 | $Br_2\phi OP(O)OC_2H_4Cl$<br>$\|$<br>$CH_2CH_2Cl$ | 180 | 180 | 180 | |
| 16 | $Cl_2\phi OC_2H_4P(O)(OC_3H_6Cl)_2$ | | 180 | 90 | 90 |

Note.—Control (no flame retardant added), rated 45.

EXAMPLE XXIII

Polyethylene terephthalate polyester (average molecular weight of 40,000), flame retardant film compositions were prepared by adding 0.2, 0.4 or 0.8 g. of the halogen-phosphorus compounds shown in Table VIII and 4.8, 4.6 or 4.2 g. of polyester chips, respectively, to a 14 x 120 mm. test tube. After heating the test tube in a Bunsen flame until the polyester flowed freely (about 250–300° C.), a ⅜" x 6" strip of aluminum screen wire was inserted and used as a stirrer to thoroughly mix the molten polyester and flame retardant. The test tube was then tilted and the polyester, flame, retardant mixture was allowed to run onto and penetrate the screen wire strip to a distance of 3–4 inches. The mixture quickly solidified on the wire upon removal from the test tube leaving a continuous film (coating) over the entire wire surface.

The flame resistance of the strips were determined according to the procedure given for acetate rayon films except (a) the coated wire strip was not folded and (b) an ignition time of 10 seconds was employed.

The flame ratings obtained are shown in Table VIII. The high degree of thermal stability shown by some of these compounds, especially Compounds 6 and 10, is of major sigificance.

EXAMPLE XXV

A rigid polyurethane foam was prepared from Compound 2.

(a) A semi-prepolymer was prepared by adding 2.5 parts of a sucrose polyether polyol having a hydroxyl number of 441 mg. KOH/gm. (prepared from propylene oxide and sucrose) to 97.5 parts of polymethylene polyphenylisocyanate preheated to 70–80° C. The adduct was heated for one hour at 80–90° C. The semi-prepolymer was found to have an NCO content of 29.5%.

The polymethylene polyphenylisocyanate used above is a mixture represented by the formula:

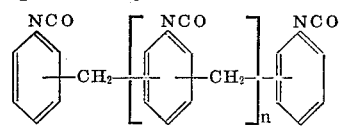

wherein $n$ ranges from about 0–2, and averages about 0.6.

A polyester polyol was prepared by heating 221.8 parts of maleic anhydride, 160 parts of pentaerythritol, and 0.04 part of sodium formate at 75–105° C. for 2 hours after which time the acid number was 5.83 meq. H+/gm. Three hundred eighty-four parts of propylene oxide was added under pressure over a 2.5 hr. period while main-

TABLE VIII.—POLYETHYLENE TEREPHTHALATE POLYESTER, FLAME RETARDANT COMPOSITIONS

| Compound Number | Structure | Flame properties at— | | |
|---|---|---|---|---|
| | | 16% loading | 8% loading | 4% loading |
| Phosphates | | | | |
| 5 | $Br_2\phi OP(O)(OC_2H_4Br)_2$ | 180 | 135 | 90 |
| 6 | $Br_2\phi OP(O)(OC_2H_4Cl)_2$ | | a 135 | 90 |
| 14 | $Cl_2\phi OC_2H_4OP(O)(OC_3H_6Cl)_2$ | a 180 | a 135 | a 90 |
| Phosphonates | | | | |
| 10 | $Br_2\phi OP(O)OC_2H_4Cl$<br>$\|$<br>$CH_2CH_2Cl$ | 180 | 135 | 90 |
| 16 | $Cl_2\phi OC_2H_4P(O)(OC_3H_6Cl)_2$ | b 135 | b 90 | b 90 |
| Phosphites | | | | |
| 1 | $Br_2\phi OP(OC_3H_6Cl)_2$ | | | (c) |
| 13 | $Cl_2\phi OC_2H_4OP(OC_3H_6Cl)_2$ | | | (c) | a Discoloration occurred during sample preparation.
b Slight discoloration occurred during sample preparation.
c Decomposition too severe during sample preparation to warrant testing.

Note.—Control (no flame retardant added), rated 90.

EXAMPLE XXIV

Polypropylene test strips containing 4, 8 and 16% of Compound 6 were prepared and flame tested according to the procedure above for polyethylene terephthalate compositions. Flame ratings of 90, 90 and 45 were obtained for polypropylene compositions containing 4, 8 and 16% of Compound 6, respectively, compared to a control sample rating NSE.

taining a temperature of 94–120° C. At the end of the propylene oxide addition, a pressure of 92 p.s.i. was recorded at a temperature of 122° C. The product was aged for 2 hours at 122–126° C. with a final pressure of 88 p.s.i. at 126° C. After venting and stripping at 128° C. and 7 mm. pressure to remove excess propylene oxide, 658 parts of polyester polyol was obtained having a hydroxyl number of 368 mg. KOH/gm. and an acid number of 0.125 mg. KOH/gm.

A sucrose-polyether polyol-polyethylene glycol blend was prepared by adding 7.5 parts of polyethylene glycol, molecular weight 200, and 7.5 parts of polyethylene glycol, molecular weight 300, to 85 parts of a sucrose polyether polyol (prepared by adding 8.7 moles of propylene oxide to 1 mole of sucrose) preheated to 80–90° C. followed by stirring.

54.6 g. of the sucrose polyether polyol-polyethylene glycol blend was thoroughly mixed with 54.6 g. of the polyester polyol above, 48.0 g. of Compound 2, 2.4 g. of a silicone oil surfactant, 2.4 g. of triethylene diamine, and 49.0 g. of trichlorofluoromethane. 150 g. of the semi-prepolymer above was then added, mixed vigorously until the onset of foaming and the foaming mix was poured into a cardboard box and allowed to rise and cure at room temperature.

The resulting polyurethane foam was found to be non-burning (total distance burned was $^{11}\!/_{16}''$) by ASTM D–1692–59T.

(b) A foam was prepared according to the above procedure except 49.0 g. of Compound 3 was used. The resulting rigid foam also rated non-burning by ASTM D–1692–59T.

EXAMPLE XXVI

Another rigid polyurethane foam was prepared by blending 24.3 parts of a sucrose polyether polyol, hydroxyl number of 410 mg. KOH/gm., 4.0 parts of a silicone oil surfactant, 4.0 parts of N,N,N',N'-tetramethylbutane-1,3-diamine, 99.5 parts of trichlorofluoromethane and 107.5 parts of bis(2-bromoethyl) 2,4-dibromophenyl phosphate (Compound 6). 250 parts of the semi-prepolymer of Example XXV was then added, followed by vigorously mixing. At the onset of foaming, the mixture was poured into a cardboard box and allowed to rise and cure at room temperature. A foam was obtained having a density of 2.24 pounds per cubic foot.

Two additional foams were prepared in a similar manner using the calculated quantity of the above phosphate to produce urethane compositions containing 0.5 and 0.25% P based on total formulation weight excepting trichlorofluoromethane. The trichlorofluoromethane was adjusted to 14.0% in each composition to provide a constant density of about 2.2 pounds per cubic foot.

The flame properties of rigid foams containing Compound 6 as determined by ASTM D–1692–59T are shown below.

| Percent Compound 6 in total formulation | Rating by ASTM D-1692-59T | Total distance burned, inches |
|---|---|---|
| 15.2 | Non-burning | $^9\!/_{16}$ |
| 7.6 | do | $^{11}\!/_{16}$ |
| 3.8 | Self-extinguishing | $2\!^{1}\!/_{4}$ |
| 0.0 | Burning | 6 |

The rigid polyurethane foams containing Compound 6 also showed excellent dimensional stability in accelerated heat and heat-moisture tests.

EXAMPLE XXVII

A flexible polyurethane foam was prepared from the recipe as shown below:

Ingredient: Parts by weight
Toluene diisocyanate (TDI) _____ 135.4
Polyether triol (MW approx. 3000) _____ 300
Compound 6 _____ 53.3
Silicone oil surfactant _____ 3.0
Stannous octoate _____ 0.9
N,N'-dimethyl ethanolamine _____ 1.2
Water _____ 10.6

All of the ingredients above except toluene diisocyanate (80%, 2,4-isomer; 20% 2,6-isomer) were blended at room temperature (about 20° C.). The diisocyanate was then added, mixed vigorously for about 12 seconds and the mixture was poured into a cardboard box and allowed to foam. After full rise had occurred, the foam was placed in an oven at 120° C. for 30 minutes. After removing to crush closed cells by mechanical compression, the foam was heated for an additional 2 hours at 120° C. The foam was found to have a density of 1.98 pounds per cubic foot and contained 0.6% P based on total formulation weight.

Two additional foams were made in a similar manner except that the concentration of Compound 6 was varied to provide phosphorus concentrations of 0.3 and 0.2%, respectively.

The flame properties of these three foams as measured by ASTM D–1692–59T are shown below:

| Percent P in composition | Flame properties | |
|---|---|---|
| | Inches burned | Rating |
| 0.6 | 0.94 | Non-burning. |
| 0.3 | 1.5 | Self-extinguishing. |
| 0.2 | 3.1 | Do. |
| 0.0 | 6.0 | Burning. |

The halogen-containing phosphites, phosphonates and phosphates of this invention are useful as flame retardants in polymer systems as shown above. Phosphates are preferred over the phosphonates or phosphites as flame retardants. The processes of manufacture utilizing the mixed halophenol - haloalkanol or halophenoxyalkanolhaloalkanol mixtures are preferred owing to lower cost products.

What we claim is:

1. A phosphorus-containing compound selected from the group consisting of:

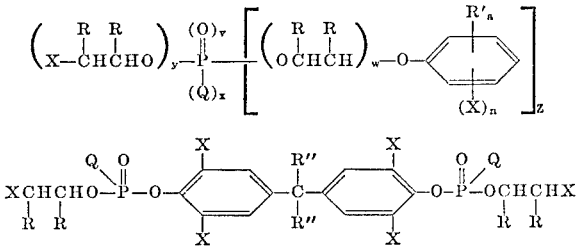

and mixtures thereof,
wherein
X is bromine or chlorine, or combinations of bromine and chlorine,
R is H, $CH_3$ or $CH_2X$, provided that when one R is other than H, the adjacent R is H,
R' is X, alkyl, haloalkyl, alkoxy, aryl, haloaryl or aralkyl, wherein halo is X,
R'' is H or $CH_3$, Q is $OCHCHX$, $CHCHX$, haloaryloxy-
        $|\ \ |$          $|\ \ |$
        R   R           R   R alkyl or haloarylpoly(oxyalkyl), wherein halo is X
$a$ is zero, 1 or 2,
$n$ is 1, 2 or 3,
$v$ is zero or 1,
$w$ is 1, 2 or 3,
$x$ is zero or 1,
$y$ is zero, 1 or 2,
$z$ is 1 or 2, and
the sum of $x+y+z$ is 3.

2. A compound of claim 1 comprising a phosphate.
3. A compound of claim 1 comprising a phosphite.
4. A compound of claim 1 comprising a phosphonate.
5. A compound of claim 1 comprising bis(2-chloroethyl)2(2,4-dichlorophenoxy)ethyl phosphite.
6. A compound of claim 1 comprising bis(2-chloropropyl)2(2,4-dichlorophenoxy)ethyl phosphite.
7. A compound of claim 1 comprising bis(2-bromoethyl)2-(2,4-dibromophenoxy)ethyl phosphate.

(References on following page)

References Cited

UNITED STATES PATENTS

| | | | |
|---|---|---|---|
| 2,828,198 | 4/1958 | Harris et al. | 260—712.3 |
| 3,058,941 | 10/1962 | Birum | 260—30.6 |
| 3,324,205 | 6/1967 | Carpenter et al. | 260—963 |
| 3,333,027 | 7/1967 | Larrison | 260—930 |
| 3,341,631 | 9/1967 | Seil et al. | 260—955 |

FOREIGN PATENTS

| | | | |
|---|---|---|---|
| 1,024,641 | 3/1966 | Great Britain | 260—964 |

OTHER REFERENCES

Cheymol et al. "Comptus Rendas des Seances de la Societe de Biologie," vol. 158, pp. 24–6, (1964).

Rubtsova et al., "Chem. Abst." vol. 59, 1512.

Foster et al., "Chem. Abst.," vol. 64, 17485.

LEWIS GOTTS, Primary Examiner

A. H. SUTTO, Assistant Examiner

U.S. Cl. X.R.

106—15, 177; 260—45.95, 930, 961, 964, 967

PO-1050
(5/69)

UNITED STATES PATENT OFFICE
CERTIFICATE OF CORRECTION

Patent No. 3,706,821                Dated December 19, 1972

Inventor(s) James J. Anderson, Wendell M. Byrd & Vasco G. Camacho

It is certified that error appears in the above-identified patent and that said Letters Patent are hereby corrected as shown below:

| | |
|---|---|
| Column 5, line 26, | Insert --)-- after "Cl". |
| Column 15, line 7, | After "phosphites" insert --, phosphates--. |
| Column 17, Table 3, | In the formula for compound 14 change "(OC$_3$H$_6$Cl" to --(OC$_3$H$_6$Cl)$_2$-- |
| Column 18, Table 4, | In the last column heading, change "4% loading" to --2% loading--. |
| Column 18, line 38, | "zame" should be --flame--. |
| Column 20, Table 5, | Under flame rating for compound number 3, change "70" to --90--. |
| Column 21, Table 8, | Under the heading compound number, change "5" to --6--; and change "6" to --5--. |
| | For compound number 16, in the column headed 16% loading, change "b135" to --135c--. |
| | For compound 16, in both instances under the heading of loading, change "b90" to --90c--. |
| | For compounds "1" and "13", under the heading of 4% loading, change "(c)" to --b--. |

Signed and sealed this 29th day of January 1974.

(SEAL)
Attest:

EDWARD M. FLETCHER, JR.          RENE D. TEGTMEYER
Attesting Officer                 Acting Commissioner of Patents